United States Patent
Imachi et al.

(10) Patent No.: US 7,056,622 B2
(45) Date of Patent: *Jun. 6, 2006

(54) NONAQUEOUS ELECTROLYTE SECONDARY BATTERY

(75) Inventors: Naoki Imachi, Sumoto (JP); Ikuro Nakane, Sumoto (JP); Satoshi Narukawa, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 494 days.

This patent is subject to a terminal disclaimer.

(21) Appl. No.: 10/158,019

(22) Filed: May 31, 2002

(65) Prior Publication Data

US 2002/0182504 A1    Dec. 5, 2002

(30) Foreign Application Priority Data

May 31, 2001 (JP) .................. P.2001-164728

(51) Int. Cl.
H01M 4/50    (2006.01)
H01M 4/52    (2006.01)

(52) U.S. Cl. ............... 429/231.1; 429/224; 429/231.3; 429/231.5; 429/231.6

(58) Field of Classification Search ............ 429/231.1, 429/231.3, 94, 224, 233, 137; 438/706, 709, 438/48; 428/210; 361/321.2; 703/22; 568/389; 423/594.4; 424/131.1; 714/785; 216/67; 252/582; 501/136
See application file for complete search history.

(56) References Cited

U.S. PATENT DOCUMENTS

| | | | |
|---|---|---|---|
| 6,071,645 A * | 6/2000 | Biensan et al. ............. | 429/223 |
| 6,756,154 B1 * | 6/2004 | Maeda et al. ............. | 429/231.3 |
| 6,805,996 B1 * | 10/2004 | Hosoya ....................... | 429/94 |
| 2003/0073002 A1 * | 4/2003 | Imachi et al. ............. | 429/231.3 |
| 2004/0126661 A1 * | 7/2004 | Nagayama et al. ......... | 429/224 |
| 2004/0142240 A1 * | 7/2004 | Nagayama et al. ....... | 429/231.1 |
| 2004/0142241 A1 * | 7/2004 | Nagayama et al. ....... | 429/231.3 |
| 2004/0214086 A1 * | 10/2004 | Bruce et al. ................ | 429/224 |

FOREIGN PATENT DOCUMENTS

| | | | |
|---|---|---|---|
| EP | 1347524 | * | 9/2003 |
| JP | 2000294242 | * | 9/1999 |
| JP | 2000-294242 | | 10/2000 |
| JP | 2000294241 | * | 10/2000 |
| JP | 2001-023617 | | 1/2001 |

OTHER PUBLICATIONS

U.S. Appl. No. 10/158,106—claims only.*

* cited by examiner

Primary Examiner—Michael Barr
Assistant Examiner—Robert Hodge
(74) Attorney, Agent, or Firm—Nixon & Vanderhye P.C.

(57) ABSTRACT

A nonaqueous electrolyte secondary battery according to the invention comprises a positive electrode containing a positive electrode active material including lithium containing composite oxide having a layer crystal structure represented by a general formula of $Li_xMn_aCo_bM_cO_2$ ($0.9 \leq X \leq 1.1$, $0.45 \leq a \leq 0.55$, $0.45 \leq b \leq 0.55$, $0 < c \leq 0.05$ and $0.9 < a+b+c \leq 1.1$ are set and M is at least one kind selected from Al, Mg, Sn, Ti and Zr), a negative electrode containing a negative electrode active material capable of intercalating and deintercalating lithium ion, a separator for separating the positive electrode from the negative electrode, and a nonaqueous electrolyte.

2 Claims, 7 Drawing Sheets

FIG. 3

| TYPE OF POSITIVE ELECTRODE | ITEM OF CRYSTAL STRUCTURE OF POSITIVE ELECTRODE ACTIVE MATERIAL | | | | | DISCHARGE CAPACITY (mAh/g) | OPAERATING VOLTAGE (V) | INITIAL CHARGE/ DISCHARGE EFFICIENCY (%) | DISCHARGE CURVE |
|---|---|---|---|---|---|---|---|---|---|
| | a | b | M | c | CRYSTAL SHAPE | | | | |
| x8 | 0.40 | 0.60 | Ti | 0.01 | THREE PHASES | 124.1 | 3.57 | 92.4 | TWO STAGES |
| a1 | 0.45 | 0.55 | Ti | 0.01 | SINGLE PHASE | 140.3 | 3.88 | 96.3 | FLAT |
| a2 | 0.475 | 0.525 | Ti | 0.01 | SINGLE PHASE | 144.2 | 3.89 | 96.4 | FLAT |
| a3 | 0.50 | 0.50 | Ti | 0.01 | SINGLE PHASE | 144.9 | 3.91 | 96.2 | FLAT |
| a4 | 0.525 | 0.475 | Ti | 0.01 | SINGLE PHASE | 144.5 | 3.90 | 96.5 | FLAT |
| a5 | 0.55 | 0.45 | Ti | 0.01 | SINGLE PHASE | 141.0 | 3.89 | 96.1 | FLAT |
| x9 | 0.60 | 0.40 | Ti | 0.01 | THREE PHASES | 126.2 | 3.60 | 92.9 | TWO STAGES |
| x10 | 0.40 | 0.60 | Al | 0.01 | THREE PHASES | 124.3 | 3.60 | 92.7 | TWO STAGES |
| b1 | 0.45 | 0.55 | Al | 0.01 | SINGLE PHASE | 140.0 | 3.90 | 96.4 | FLAT |
| b2 | 0.475 | 0.525 | Al | 0.01 | SINGLE PHASE | 143.9 | 3.89 | 96.1 | FLAT |
| b3 | 0.50 | 0.50 | Al | 0.01 | SINGLE PHASE | 144.7 | 3.89 | 96.5 | FLAT |
| b4 | 0.525 | 0.475 | Al | 0.01 | SINGLE PHASE | 144.4 | 3.88 | 96.6 | FLAT |
| b5 | 0.55 | 0.45 | Al | 0.01 | SINGLE PHASE | 141.6 | 3.87 | 96.3 | FLAT |
| x11 | 0.60 | 0.40 | Al | 0.01 | THREE PHASES | 127.0 | 3.64 | 93.4 | TWO STAGES |
| x12 | 0.40 | 0.60 | Mg | 0.01 | THREE PHASES | 124.3 | 3.57 | 93.1 | TWO STAGES |
| c1 | 0.45 | 0.55 | Mg | 0.01 | SINGLE PHASE | 140.0 | 3.87 | 96.2 | FLAT |
| c2 | 0.475 | 0.525 | Mg | 0.01 | SINGLE PHASE | 143.9 | 3.90 | 96.3 | FLAT |
| c3 | 0.50 | 0.50 | Mg | 0.01 | SINGLE PHASE | 144.7 | 3.88 | 96.2 | FLAT |
| c4 | 0.525 | 0.475 | Mg | 0.01 | SINGLE PHASE | 144.4 | 3.91 | 96.1 | FLAT |
| c5 | 0.55 | 0.45 | Mg | 0.01 | SINGLE PHASE | 141.6 | 3.90 | 96.3 | FLAT |
| x13 | 0.60 | 0.40 | Mg | 0.01 | THREE PHASES | 127.0 | 3.61 | 93.0 | TWO STAGES |
| x1 | 0.40 | 0.60 | NOTHING | | THREE PHASES | 124.9 | 3.59 | 92.8 | TWO STAGES |
| x2 | 0.45 | 0.55 | NOTHING | | SINGLE PHASE | 140.6 | 3.88 | 96.1 | FLAT |
| x3 | 0.475 | 0.525 | NOTHING | | SINGLE PHASE | 144.9 | 3.89 | 96.0 | FLAT |
| x4 | 0.50 | 0.50 | NOTHING | | SINGLE PHASE | 145.2 | 3.90 | 96.3 | FLAT |
| x5 | 0.525 | 0.475 | NOTHING | | SINGLE PHASE | 144.8 | 3.88 | 96.2 | FLAT |
| x6 | 0.55 | 0.45 | NOTHING | | SINGLE PHASE | 141.3 | 3.87 | 95.9 | FLAT |
| x7 | 0.60 | 0.40 | NOTHING | | THREE PHASES | 126.5 | 3.62 | 93.1 | TWO STAGES |

FIG. 4

| TYPE OF BATTERY | ITEM OF POSITIVE ELECTRODE ACTIVE MATERIAL | | | | CAPACITY RETENTION RATE AFTER 500 CYCLES (%) |
|---|---|---|---|---|---|
| | a | b | M | c | |
| D1 | 0.49 | 0.49 | Al | 0.02 | 76.6 |
| D2 | 0.49 | 0.49 | Mg | 0.02 | 79.1 |
| D3 | 0.49 | 0.49 | Sn | 0.02 | 80.1 |
| D4 | 0.49 | 0.49 | Ti | 0.02 | 80.6 |
| D5 | 0.49 | 0.49 | Zr | 0.02 | 79.8 |
| X4 | 0.50 | 0.50 | NOTHING | | 71.0 |

FIG. 5

| TYPE OF BATTERY | ITEM OF POSITIVE ELECTRODE ACTIVE MATERIAL | | | | 4.2V FINAL CHARGING AFTER PRESERVATION (%) | | | 2.75V FINAL DISCHARGING AFTER PRESERVATION (%) | |
|---|---|---|---|---|---|---|---|---|---|
| | a | b | M | c | RETENTION RATE | RECOVERY RATE | EXPANSION RATE | RECOVERY RATE | EXPANSION RATE |
| D1 | 0.49 | 0.49 | Al | 0.02 | 75.6 | 87.6 | 10.2 | 92.7 | 7.9 |
| D2 | 0.49 | 0.49 | Mg | 0.02 | 75.4 | 87.9 | 9.9 | 93.1 | 8.1 |
| D3 | 0.49 | 0.49 | Sn | 0.02 | 74.3 | 85.9 | 11.3 | 91.2 | 10.1 |
| D4 | 0.49 | 0.49 | Ti | 0.02 | 74.6 | 86.7 | 11.6 | 91.6 | 10.4 |
| D5 | 0.49 | 0.49 | Zr | 0.02 | 74.2 | 86.2 | 11.0 | 91.1 | 10.0 |
| X4 | 0.50 | 0.50 | NOTHING | | 71.3 | 80.9 | 14.6 | 88.4 | 11.3 |

FIG. 6

| TYPE OF BATTERY | ITEM OF CRYSTAL STRUCTURE OF POSITIVE ELECTRODE ACTIVE MATERIAL | | | | | CAPACITY RETENTION RATE AFTER 500 CYCLES (%) | CHARGE/DISCHARGE EFFICIENCY (%) |
|---|---|---|---|---|---|---|---|
| | a | b | M | c | CRYSTAL SHAPE | | |
| E 1 | 0.495 | 0.495 | Ti | 0.01 | SINGLE PHASE | 80.4 | 96.5 |
| E 2 | 0.490 | 0.490 | Ti | 0.02 | SINGLE PHASE | 80.6 | 96.7 |
| E 3 | 0.485 | 0.485 | Ti | 0.03 | SINGLE PHASE | 80.3 | 96.8 |
| E 4 | 0.475 | 0.475 | Ti | 0.05 | SINGLE PHASE | 80.4 | 96.6 |
| X 14 | 0.450 | 0.450 | Ti | 0.10 | THREE PHASES | 68.9 | 92.1 |
| F 1 | 0.495 | 0.495 | Al | 0.01 | SINGLE PHASE | 76.4 | 96.3 |
| F 2 | 0.490 | 0.490 | Al | 0.02 | SINGLE PHASE | 76.5 | 96.6 |
| F 3 | 0.485 | 0.485 | Al | 0.03 | SINGLE PHASE | 76.5 | 96.5 |
| F 4 | 0.475 | 0.475 | Al | 0.05 | SINGLE PHASE | 76.3 | 96.3 |
| X 15 | 0.450 | 0.450 | Al | 0.10 | THREE PHASES | 63.4 | 91.9 |
| G 1 | 0.495 | 0.495 | Mg | 0.01 | SINGLE PHASE | 79.1 | 96.2 |
| G 2 | 0.490 | 0.490 | Mg | 0.02 | SINGLE PHASE | 79.3 | 96.1 |
| G 3 | 0.485 | 0.485 | Mg | 0.03 | SINGLE PHASE | 79.3 | 96.5 |
| G 4 | 0.475 | 0.475 | Mg | 0.05 | SINGLE PHASE | 79.0 | 96.4 |
| X 16 | 0.450 | 0.450 | Mg | 0.10 | THREE PHASES | 67.9 | 92.3 |
| X 4 | 0.50 | 0.50 | NOTHING | | SINGLE PHASE | 71.0 | 96.3 |

FIG. 7

| TYPE OF POSITIVE ELECTRODE | ITEM OF CRYSTAL STRUCTURE OF POSITIVE ELECTRODE ACTIVE MATERIAL | | | | |
|---|---|---|---|---|---|
| | a | b | c | a + b + c | CRYSTAL SHAPE |
| θ 1 | 0.45 | 0.45 | 0.01 | 0.91 | SINGLE PHASE |
| θ 2 | 0.47 | 0.47 | 0.01 | 0.95 | SINGLE PHASE |
| θ 3 | 0.49 | 0.49 | 0.02 | 1.00 | SINGLE PHASE |
| θ 4 | 0.51 | 0.51 | 0.03 | 1.05 | SINGLE PHASE |
| θ 5 | 0.53 | 0.53 | 0.04 | 1.10 | SINGLE PHASE |
| χ 17 | 0.55 | 0.55 | 0.05 | 1.15 | THREE PHASES |
| ι 1 | 0.46 | 0.45 | 0.01 | 0.92 | SINGLE PHASE |
| ι 2 | 0.47 | 0.46 | 0.02 | 0.95 | SINGLE PHASE |
| ι 3 | 0.49 | 0.48 | 0.03 | 1.00 | SINGLE PHASE |
| ι 4 | 0.51 | 0.50 | 0.04 | 1.05 | SINGLE PHASE |
| ι 5 | 0.53 | 0.52 | 0.05 | 1.10 | SINGLE PHASE |
| χ 18 | 0.55 | 0.54 | 0.05 | 1.14 | THREE PHASES |
| κ 1 | 0.45 | 0.46 | 0.01 | 0.92 | SINGLE PHASE |
| κ 2 | 0.46 | 0.47 | 0.02 | 0.95 | SINGLE PHASE |
| κ 3 | 0.48 | 0.49 | 0.03 | 1.00 | SINGLE PHASE |
| κ 4 | 0.50 | 0.51 | 0.04 | 1.05 | SINGLE PHASE |
| κ 5 | 0.52 | 0.53 | 0.05 | 1.10 | SINGLE PHASE |
| χ 19 | 0.54 | 0.55 | 0.05 | 1.14 | THREE PHASES |

NONAQUEOUS ELECTROLYTE SECONDARY BATTERY

BACKGROUND OF THE INVENTION

1. Field of the Invention

The present invention relates to a nonaqueous electrolyte secondary battery comprising a positive electrode containing a positive electrode active material capable of intercalating and deintercalating lithium ion, a negative electrode containing a negative electrode active material capable of intercalating and deintercalating lithium ion, a separator between the positive electrode and the negative electrode, and a nonaqueous electrolyte.

2. Description of the Related Art

For a battery to be used in portable electronic and communicating equipment such as a small-sized video camera, a mobile telephone and a notebook personal computer, recently, a nonaqueous electrolyte secondary battery represented by a lithium ion battery having an alloy or a carbon material capable of intercalating and deintercalating lithium ion as a negative electrode active material and lithium containing composite oxide, for example, lithium cobalt oxide ($LiCoO_2$), lithium nickel oxide ($LiNiO_2$) or lithium manganese oxide ($LiMn_2O_4$) as a positive electrode material has been put into practical use to be a battery having a small size, a light weight and a high capacity and capable of carrying out a charge and discharge.

Since lithium nickel oxide ($LiNiO_2$) in the lithium containing composite oxide to be used for the positive electrode material of the nonaqueous electrolyte secondary battery has a feature of a high capacity and a drawback of a poor safety and a low discharge operating voltage, there is a problem in that it is inferior to the lithium cobalt oxide ($LiCoO_2$). Moreover, lithium manganese oxide ($LiMn_2O_4$) has a rich source and is inexpensive and excellent in safety, and has a drawback that an energy density is low and manganese itself is dissolved at a high temperature. Therefore, there is a problem in that it is inferior to the lithium cobalt oxide ($LiCoO_2$). At the present time, accordingly, the use of the lithium cobalt oxide ($LiCoO_2$) to be the lithium containing composite oxide has been a mainstream.

Recently, a novel positive electrode active material such as olivine type $LiMPO_4$ (M=Fe, Co) or 5V class $LiNi_{0.5}Mn_{1.5}O_4$ has been studied and attention has been paid to the same material to be a positive electrode active material for a next generation nonaqueous electrolyte secondary battery. However, the positive electrode active material has a high discharge operating voltage of 4 to 5 V which exceeds the withstand potential (decomposition potential) of an organic electrolyte used in the nonacqueous electrolyte secondary battery. For this reason, a deterioration in a cycle is increased with a charge and discharge. Therefore, it is necessary to optimize other battery components, for example, the organic electrolyte so that there is a problem in that a long time is taken to achieve practical use.

On the other hand, lithium—manganese composite oxide having a 3V class layer structure has been proposed. There is a problem in that the lithium—manganese composite oxide having the layer structure has a large discharge capacity, while a discharge operating voltage tends to be divided into two stages in a 4V region and a 3V region and a cycle is deteriorated greatly. Moreover, the discharge is mainly carried out in the 3V region.

Therefore, there is a problem in that it is hard to directly substitute the same composite oxide for the use of a non-aqueous electrolyte secondary battery using, as a positive electrode active material, lithium cobalt oxide utilizing a 4V region which is currently put into practical use.

Under the circumstances, there has been proposed lithium—nickel manganese composite oxide ($LiNi_{0.5}Mn_{0.5}O_2$) having a layer structure. The lithium—nickel—manganese composite oxide ($LiNi_{0.5}Mn_{0.5}O_2$) having the layer structure includes a plateau in a 4V region and a discharge capacity per unit mass is comparatively high, that is, 140 to 150 mAh/g, and thus has an excellent characteristic as a novel positive electrode active material and has thereby been considered to be hopeful as one of the positive electrode active materials for a novel nonacqueous electrolyte secondary battery.

However, a positive electrode active material ($LiNi_{0.5}Mn_{0.5}O_2$) greatly takes over the characteristics of lithium containing composite oxide mainly containing nickel in that an initial charge/discharge efficiency is low, that is, 80 to 90%, a discharge operating voltage is slightly low as in lithium nickel oxide and a cycle characteristic is poorer than that of lithium cobalt oxide, and there is a problem in that it is necessary to improve the characteristics more greatly.

On the other hand, JP-A-2001-23617 has proposed a lithium secondary battery in which a part of $LiMnO_2$ in lithium—manganese composite oxide ($LiMnO_2$) having a 3V class layer structure is substituted for Al, Fe, Co, Ni, Mg or Cr to obtain $Li_xMn_yM_{1-y}O_2$ 1.0) (0<X≦1.1, 0.5≦Y≦1.0) so that a high temperature characteristic is improved. In the lithium secondary battery proposed in the JP-A-2001-23617, there is a problem in that it is hard to directly substitute the same composite oxide for the use of the lithium secondary battery utilizing, as a positive electrode active material, lithium cobalt oxide using a 4V region because a discharge voltage of $Li_xMn_yM_{1-y}O_2$ to be used as a positive electrode active material is low.

SUMMARY OF THE INVENTION

The invention has been made to solve the problem described above and has an object to provide a positive electrode active material having a plateau potential in a 4V region which is almost equivalent to lithium cobalt oxide and has a large discharge capacity to obtain a nonaqueous electrolyte secondary battery which is excellent in a battery characteristic such as a cycle characteristic or a high temperature characteristic.

In order to achieve the object, the invention provides a nonaqueous electrolyte secondary battery comprising a positive electrode containing a positive electrode active material including lithium containing composite oxide having a layer crystal structure represented by a general formula of $Li_xMn_aCo_bM_cO_2$ (0.9≦X≦1.1, 0.45≦a≦0.55, 0.45≦b≦0.55, 0<c≦0.05 and 0.9<a+b+c≦1.1 are set and M is at least one kind selected from Al, Mg, Sn, Ti and Zr), a negative electrode containing a negative electrode active material capable of intercalating and deintercalating lithium ion, a separator for separating the positive electrode from the negative electrode, and a nonacqueous electrolyte.

When the a and b values of the positive electrode active material represented by the general formula of $Li_xMn_aCo_bM_cO_2$ range from 0.45 to 0.55 (0.45≦a≦0.55, 0.45≦b≦0.55), the layer crystal structure is also an $\alpha$-$NaFeO_2$ type crystal structure (monoclinic structure), the peaks of $LiCoO_2$ and $Li_2MnO_3$ are not observed and they have a single phase so that a flat discharge curve is obtained. On the other hand, when the a and b values exceed the range of 0.45 to 0.55, the peaks of the $LiCoO_2$ and $Li_2MnO_3$ are generated so that a crystal structure has two phases or more so that the discharge curve also tends to be divided into two stages from the end of the discharge. As a result of an experiment, moreover, a discharge capacity, a discharge operating voltage and an initial charge/discharge efficiency can be enhanced when the a and b values range from 0.45 to 0.55.

For this reason, it is necessary to carry out a synthesis such that the a and b values of the positive electrode active material represented by the general formula of $Li_xMn_aCo_b$-$M_cO_2$ are set to $0.45 \leq a \leq 0.55$ and $0.45 \leq b \leq 0.55$, respectively. In this case, a compound having such a layer crystal structure does not have many sites in which a lithium ion can be inserted and desorbed as in spinel type lithium manganese oxide. For this reason, the lithium ion is inserted and desorbed into and from layers. Therefore, an x value of the positive electrode active material represented by $Li_xMn_a$-$Co_bM_cO_2$ is at most 1.1. In a state in which the synthesis stage of the positive electrode active material, moreover, a lithium source has only the positive electrode active material during the fabrication of a battery. In consideration thereof, therefore, it is required that the x value should be at least 0.9. In this respect, it is desirable that the synthesis should be carried out to obtain the x value of $0.9 \leq x \leq 1.1$.

It has been found that a heterologous element (M=Al, Mg, Sn, Ti, Zr) is added to a lithium—manganese—cobalt (Li—Mn—Co) composite oxide, a part of the composite oxide is substituted for the heterologous element (M=Al, Mg, Sn, Ti, Zr) to obtain $Li_xMn_aCo_bM_cO_2$(M=Al, Mg, Sn, Ti, Zr) so that a capacity retention rate can be enhanced after high temperature preservation. The reason is that a part of Li—Mn—Co based composite oxide is substituted for the heterologous element (M) such as Al, Mg, Sn, Ti and Zr so that the crystallinity of the layer structure is stabilized.

In this case, when the composition ratio (substitution amount) of the heterologous element such as Al, Mg, Sn, Ti or Zr exceeds 0.05 (c=0.05), the crystal structure tends to have two phases or more. If the amount of substitution of the heterologous element is too large, it is hard to maintain a crystal shape so that a capacity retention rate and an initial charge/discharge efficiency during the high temperature preservation are reduced. Consequently, it is necessary to set the composition ratio (substitution amount) of the heterologous element such as Al, Mg, Sn, Ti or Zn to be 0.05 or less ($0 < c \leq 0.05$). Although other elements such as Ni, Ca and Fe were investigated as the heterologous element, the effect of enhancing the capacity retention rate at time of the high temperature preservation could not be observed for the other elements.

From this viewpoint, the positive electrode active material represented by the general formula of $Li_xMn_aCo_bM_cO_2$ can be synthesized to obtain $0.90 \leq x \leq 1.10$, $0.45 \leq a \leq 0.55$, $0.45 \leq b \leq 0.55$ and $0 < c \leq 0.05$ and the heterologous element (M) is to be selected from Al, Mg, Sn, Ti and Zr.

Furthermore, it was found that the layer crystal structure can be maintained if the (a+b+c) value of the positive electrode active material represented by the general formula of $Li_xMn_aCo_bM_cO_2$ ranges from 0.90 to 1.10. On the other hand, if the (a+b+c) value exceeds the range of 0.90 to 1.10, the peaks of $LiCoO_2$ and $Li_2MnO_3$ appear in an X-ray diffraction peak to obtain a mixture with a crystal structure having two phases or more. From this viewpoint, it is necessary to prepare the (a+b+c) value of the positive electrode active material represented by the general formula of $Li_xMn_aCo_bM_cO_2$ to $0.90 < a+b+c \leq 1.10$. If the composition ratio of a and b ranges of $0.9 < a/b < 1.1$, the discharge capacity is enhanced. Therefore, it is desirable that the synthesis should be carried out to obtain the composition ratio ranging within $0.9 < a/b < 1.1$.

BRIEF DESCRIPTION OF THE DRAWINGS

FIG. 3 is a table showing a discharge capacity (mAh/g) for 1 g of an active material of each of the positive electrodes in this invention.

FIG. 4 is a table showing a capacity retention rate after 500 cycles in this invention.

FIG. 5 is a table showing a table of recovery discharge capacity and battery expansion rates of the preserved batteries in this invention.

FIG. 6 is a table showing a capacity retention rate after 500 cycles in other embodiments in this invention.

FIG. 7 is a table showing relationship between values of the positive electrode active material and the crystal shape in this invention.

DESCRIPTION OF THE PREFERRED EMBODIMENTS

Figure 1:
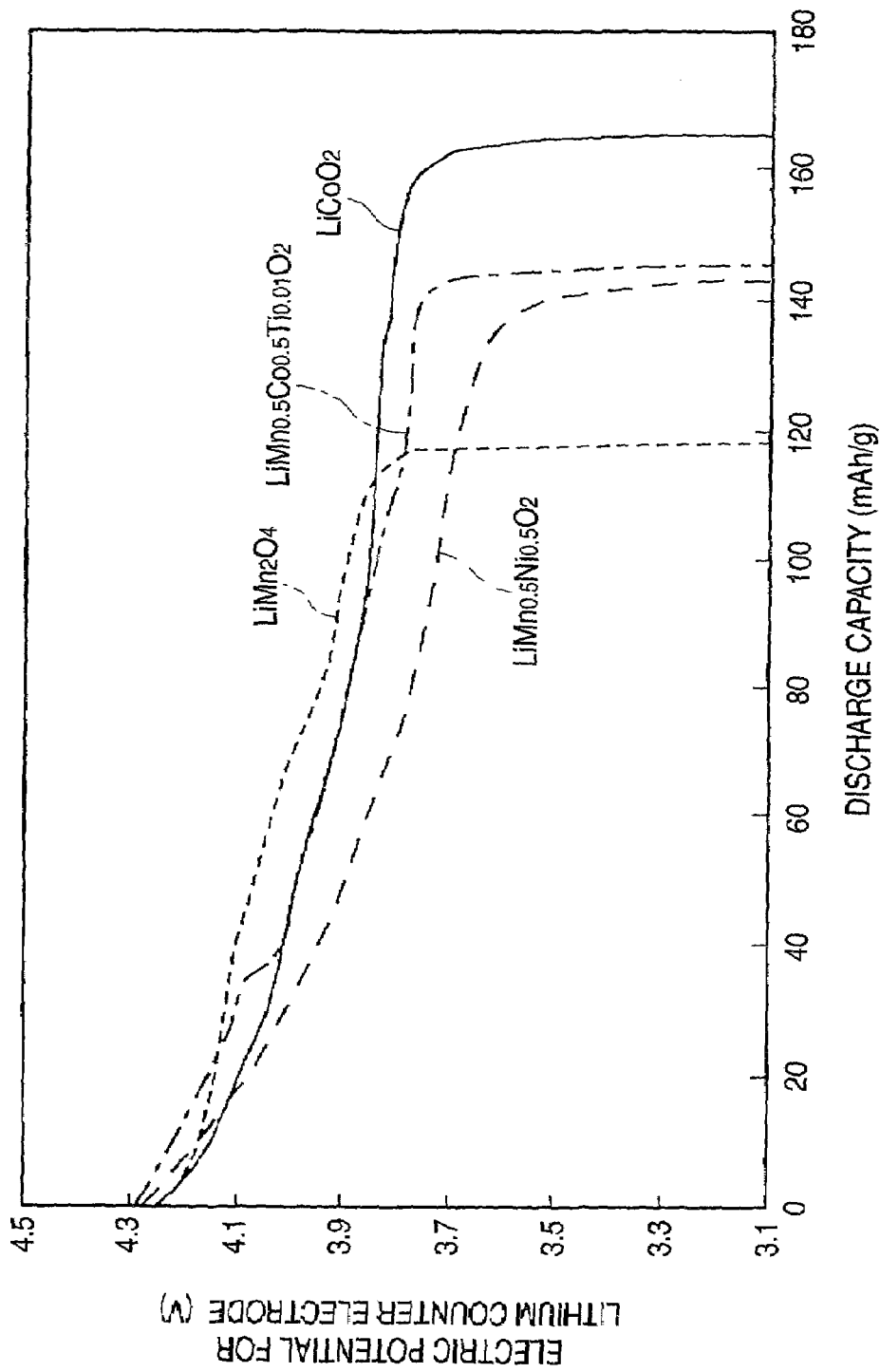
FIG. 1 is a chart showing a discharge curve (the relationship between a unit active material capacity (mAh/g) and a discharge voltage (an electric potential for a lithium counter electrode))

Subsequently, an embodiment of the invention will be described below and the invention is not restricted to the embodiment but can be properly carried out without changing the object of the invention.

1. Preparation of Positive Electrode Active Material (1) EXAMPLES 1 TO 5

After lithium hydroxide, manganese oxide and cobalt oxide were dissolved in caustic soda respectively, they were mixed to have a predetermined mole ratio based on a hydroxide conversion to obtain a mixed solution. Subsequently, titanium oxide was added to and mixed with the mixed solution to have 0.01 mole % for the mole ratio of cobalt hydroxide to manganese hydroxide, and the mixture was then baked provisionally at a low temperature of approximately 500° C. Thereafter, the mixture was baked at a temperature of 800 to 1000° C. in the atmosphere so that a positive electrode active material ($LiMn_aCo_bTi_{0.01}C_2$) according to each of examples 1 to 5 was obtained. In the mixed solution, a positive electrode active material ($LiMn_{0.45}Co_{0.5}Ti_{0.01}O_2$) prepared to have the mole ratio of the lithium hydroxide, the manganese oxide and the cobalt oxide of 1:0.45(a=0.45):0.55(b=0.55) based on the hydroxide conversion was set to be a positive electrode active material α1 according to the example 1.

Similarly, a positive electrode active material ($LiMn_{0.475}Co_{0.525}Ti_{0.01}O_2$) prepared to have a mole ratio of 1:0.475(a=0.475):0.525 (b=0.525) was set to be a positive electrode active material α2 according to the example 2, a positive electrode active material ($LiMn_{0.50}Co_{0.50}Ti_{0.01}O_2$) prepared to have a mole ratio of 1:0.50(a=0.50):0.50 (b=0.50) was set to be a positive electrode active material α3 according to the example 3, a positive electrode active material ($LiMn_{0.55}Co_{0.45}Ti_{0.01}O_2$) prepared to have a mole ratio of 1:0.525(a=0.525):0.475 (b=0.475) was set to be a positive electrode active material α4 according to the example 4, and a positive electrode active material ($LiMn_{0.55}Co_{0.45}Ti_{0.01}O_2$) prepared to have a mole ratio of 1:0.55(a=0.55):0.45(b=0.45) was set to be a positive electrode active material α5 according to the example 5.

When the X-ray diffraction pattern of each of the positive electrode active materials α1 to α5 was obtained, the peaks of $LiCoO_2$ and $Li_2MnO_3$ were not observed and an $\alpha$-$NaFeO_2$ type crystal structure (a layer crystal structure having a single phase) was found.

(2) EXAMPLES 6 TO 10

Aluminum oxide was added to and mixed with the same mixed solution as that in each of the examples 1 to 5 to have 0.01 mole % for the mole ratio of cobalt hydroxide to manganese hydroxide, and the mixture was then baked in the same manner as in each of the examples 1 to 5 so that a positive electrode active material ($LiMn_aCo_bAl_{0.01}O_2$) according to each of examples 6 to 10 was obtained. A positive electrode active material ($LiMn_{0.45}Co_{0.55}Al_{0.01}O_2$) prepared to have the mole ratio of lithium hydroxide, manganese oxide and cobalt oxide of 1:0.45(a=0.45):0.55 (b=0.55) based on the hydroxide conversion was set to be a positive electrode active material β1 according to the example 6.

Similarly, a positive electrode active material ($LiMn_{0.475}Co_{0.525}Al_{0.01}O_2$) prepared to have a mole ratio of 1:0.475(a=0.475):0.525 (b=0.525) was set to be a positive electrode active material β2 according to the example 7, a positive electrode active material ($LiMn_{0.50}Co_{0.50}Al_{0.01}O_2$) prepared to have a mole ratio of 1:0.50(a=0.50):0.50 (b=0.50) was set to be a positive electrode active material β3 according to the example 8, a positive electrode active material ($LiMn_{0.525}Co_{0.475}Al_{0.01}O_2$) prepared to have a mole ratio of 1:0.525(a=0.525):0.475 (b=0.475) was set to be a positive electrode active material β4 according to the example 9, and a positive electrode active material ($LiMn_{0.55}Co_{0.45}Al_{0.01}O_2$) prepared to have a mole ratio of 1:0.55(a=0.55):0.45(b=0.45) was set to be a positive electrode active material β5 according to the example 10.

When the X-ray diffraction pattern of each of the positive electrode active materials β1 to β5 was obtained, the peaks of $LiCoO_2$ and $Li_2MnO_3$ were not observed and an $\alpha$-$NaFeO_2$ type crystal structure (a layer crystal structure having a single phase) was found.

(3) EXAMPLES 11 TO 15

Magnesium oxide was added to and mixed with the same mixed solution as that in each of the examples 1 to 5 to have 0.01 mole % for the mole ratio of cobalt hydroxide to manganese hydroxide, and the mixture was then baked in the same manner as in each of the examples 1 to 5 so that a positive electrode active material ($LiMn_aCo_bMg_{0.01}O_2$) according to examples 11 to 15 was obtained. A positive electrode active material ($LiMn_{0.45}Co_{0.55}Mg_{0.01}O_2$) prepared to have the mole ratio of lithium hydroxide, manganese oxide and cobalt oxide of 1:0.45(a=0.45):0.55(b=0.55) based on the hydroxide conversion was set to be a positive electrode active material γ1 according to the example 11.

Similarly, a positive electrode active material ($LiMn_{0.475}Co_{0.25}Mg_{0.01}O_2$) prepared to have a mole ratio of 1:0.475(a=0.475):0.525 (b=0.525) was set to be a positive electrode active material γ2 according to the example 12, a positive electrode active material ($LiMn_{0.50}Co_{0.50}Mg_{0.01}O_2$) prepared to have a mole ratio of 1:0.50(a=0.50):0.50 (b=0.50) was set to be a positive electrode active material γ3 according to the example 13, a positive electrode active material ($LiMn_{0.525}Co_{0.475}Mg_{0.01}O_2$) prepared to have a mole ratio of 1:0.525(a=0.525):0.475 (b=0.475) was set to be a positive electrode active material γ4 according to the example 14, and a positive electrode active material ($LiMn_{0.55}Co_{0.45}Mg_{0.01}O_2$) prepared to have a mole ratio of 1:0.55(a=0.55):0.45(b=0.45) was set to be a positive electrode active material γ5 according to the example 15.

When the X-ray diffraction pattern of each of the positive electrode active materials γ1 to γ5 was obtained, the peaks of $LiCoO_2$ and $Li_2MnO_3$ were not observed and an $\alpha$-$NaFeO_2$ type crystal structure (a layer crystal structure having a single phase) was found.

(4) COMPARATIVE EXAMPLES 1 TO 7

After lithium hydroxide, manganese oxide and cobalt oxide were dissolved in caustic soda respectively, they were prepared and mixed to have a predetermined mole ratio based on a hydroxide conversion. Subsequently, the mixture was then baked provisionally at a low temperature of approximately 500° C. and was then baked at a temperature of 800 to 1000° C. in the atmosphere so that a positive electrode active material ($LiMn_aCo_bC_2$) according to each of comparative examples 1 to 7 was obtained. A positive electrode active material ($LiMn_{0.40}Co_{0.60}O_2$) prepared to have the mole ratio of lithium hydroxide, manganese oxide and cobalt oxide of 1:0.40(a=0.40):0.60(b=0.60) based on the hydroxide conversion was set to be a positive electrode active material χ1 according to the comparative example 1. Similarly, a positive electrode active material ($LiMn_{0.45}Co_{0.55}O_2$) prepared to be 1:0.45(a=0.45):0.55 (b=0.55) was set to be a positive electrode active material χ2 according to the comparative example 2, a positive electrode active material ($LiMn_{0.475}Co_{0.525}O_2$) prepared to be 1:0.475 (a=0.475):0.525(b=0.525) was set to be a positive electrode active material χ3 according to the comparative example 3, and a positive electrode active material ($LiMn_{0.50}Co_{0.50}O_2$) prepared to be 1:0.50(a=0.50):0.50 (b=0.50) was set to be a positive electrode active material χ4 according to the comparative example 4.

Furthermore, a positive electrode active material ($LiMn_{0.525}Co_{0.475}O_2$) prepared to be 1:0.525(a=0.525):0.475(b=0.475) was set to be a positive electrode active material χ5 according to the comparative example 5, a positive electrode active material ($LiMn_{0.55}Co_{0.45}O_2$) prepared to be 1:0.55 (a=0.55):0.45(b=0.45) was set to be a positive electrode active material χ6 according to the comparative example 6, and a positive electrode active material ($LiMn_{0.60}Co_{0.40}O_2$) prepared to be 1:0.60(a=0.60):0.40 (b=0.40) was set to be a positive electrode active material χ7 according to the comparative example 7.

When the X-ray diffraction pattern of each of the positive electrode active materials χ1 to χ7 was obtained, the peaks of $LiCoO_2$ and $Li_2MnO_3$ were not observed and a mixture with a crystal structure having three phases was found.

(5) COMPARATIVE EXAMPLES 8 AND 9

Titanium oxide was added to and mixed with the same mixed solution as that in each of the examples 1 to 5 to have 0.01 mole % for the mole ratio of cobalt hydroxide to manganese hydroxide, and the mixture was then baked in the same manner as in the examples 1 to 5 so that a positive electrode active material ($LiMn_aCo_bTi_{0.01}O_2$) according to each of examples 8 and 9 was obtained. A positive electrode active material ($LiMn_{0.40}Co_{0.60}Ti_{0.01}O_2$) prepared to have the mole ratio of lithium hydroxide, manganese oxide and cobalt oxide of 1:0.40(a=0.40):0.60(b=0.60) based on the hydroxide conversion was set to be a positive electrode active material χ8 according to the comparative example 8, and a positive electrode active material (LiMn$_{0.60}$Co$_{0.40}$Ti$_{0.01}$O$_2$) prepared to have a mole ratio of 1:0.60(a=0.60):0.40(b=0.40) was set to be a positive electrode active material χ9 according to the comparative example 9. When the X-ray diffraction pattern of each of the positive electrode active materials χ8 and χ9 was obtained, the peaks of LiCoO$_2$ and Li$_2$MnO$_3$ were observed and a mixture with a crystal structure having three phases was found.

(6) COMPARATIVE EXAMPLES 10 AND 11

Aluminum oxide was added to and mixed with the same mixed solution as that in each of the examples 1 to 5 to have 0.01 mole % for the mole ratio of cobalt hydroxide to manganese hydroxide, and the mixture was then baked in the same manner as in the examples 1 to 5 so that a positive electrode active material (LiMn$_a$Co$_b$Al$_{0.01}$O$_2$) according to each of comparative examples 10 and 11 was obtained. A positive electrode active material (LiMn$_{0.40}$Co$_{0.60}$Al$_{0.01}$O$_2$) prepared to have the mole ratio of lithium hydroxide, manganese oxide and cobalt oxide of 1:0.40(a=0.40):0.60 (b=0.60) based on the hydroxide conversion was set to be a positive electrode active material χ10 according to the comparative example 10, and a positive electrode active material (LiMn$_{0.60}$Co$_{0.40}$Al$_{0.01}$O$_2$) prepared to have a mole ratio of 1:0.60(a=0.60):0.40(b=0.40) was set to be a positive electrode active material χ11 according to the comparative example 11. When the X-ray diffraction pattern of each of the positive electrode active materials χ10 and χ11 was obtained, the peaks of LiCoO$_2$ and Li$_2$MnO$_3$ were observed and a mixture with a crystal structure having three phases was found.

(7) COMPARATIVE EXAMPLES 12 AND 13

Magnesium oxide was added to and mixed with the same mixed solution as that in each of the examples 1 to 5 to have 0.01 mole % for the mole ratio of cobalt hydroxide to manganese hydroxide, and the mixture was then baked in the same manner as in the examples 1 to 5 so that a positive electrode active material (LiMn$_a$Co$_b$Mg$_{0.01}$O$_2$) according to each of comparative examples 12 and 13 was obtained. A positive electrode active material (LiMn$_{0.40}$Co$_{0.60}$Mg$_{0.01}$O$_2$) prepared to have the mole ratio of lithium hydroxide, manganese oxide and cobalt oxide of 1:0.40(a=0.40):0.60 (b=0.60) based on the hydroxide conversion was set to be a positive electrode active material χ12 according to the comparative example 12, and a positive electrode active material (LiMn$_{0.60}$Co$_{0.40}$Mg$_{0.01}$O$_2$) prepared to have a mole ratio of 1:0.60(a=0.60):0.40(b=0.40) was set to be a positive electrode active material χ13 according to the comparative example 13. When the X-ray diffraction pattern of each of the positive electrode active materials χ12 and χ13 was obtained, the peaks of LiCoO$_2$ and Li$_2$MnO$_3$ were observed and a mixture with a crystal structure having three phases was found.

2. Formation of Positive Electrode

By using the positive electrode active materials α1 to α5, β1 to β5, γ1 to γ5 and χ1 to χ13 thus prepared as described above respectively, subsequently, a carbon conductive agent and a fluororesin based binder were mixed with the positive electrode active materials α1 to α5, β1 to β5, γ1 to γ5 and χ1 to χ13 in a constant rate (for example, a mass ratio of 92:5:3) to obtain a positive electrode mixture. Then, the positive electrode mixture was applied to both surfaces of a positive electrode formed of an aluminum foil and was thereafter dried, and subsequently, was rolled to have a predetermined thickness to fabricate positive electrodes a1 to a5, b1 to b5, c1 to c5 and x1 to x13 respectively.

3. Single Electrode Test

The positive electrodes a1 to a5, b1 to b5, c1 to c5 and x1 to x13 fabricated as described above were used and were accommodated in an open type battery jar respectively by utilizing a lithium metal plate for their counter electrodes and reference electrodes, and an electrolyte having LiPF$_6$ dissolved in a mixed solvent mixing ethylene carbonate and diethyl carbonate in a volume ratio of 3:7 was injected into the battery jar so that an open type simple cell was fabricated. Subsequently, the simple cell thus fabricated was charged at a room temperature to 4.3 V for the counter electrode and was then discharged to 2.85 V for the counter electrode to obtain a discharge capacity from a discharging time.

Moreover, a discharge voltage for the discharging time during the discharge was measured to obtain a discharge curve and a discharge operating voltage. After a test, a discharge capacity (mAh/g) for 1 g of an active material of each of the positive electrodes a1 to a5, b1 to b5, c1 to c5 and x1 to x13 was calculated so that a result shown in FIG. 3 was obtained. Furthermore, an initial charge/discharge efficiency was obtained based on the following equation (1) so that the result shown in FIG. 3 was obtained.

Initial charge/discharge efficiency (%)=(discharge capacity/charge capacity)X 100    (1)

In FIG. 3 showing FIG. 3, a, b, c and M indicate the a value, the b value, the c value and the heterorogous element M, wherein the positive electrode active material is represented by a general formula of Li$_x$Mn$_a$Co$_b$M$_c$O$_2$.

The following was apparent from the result of FIG. 3. More specifically, when the a and b values of the positive electrode active material represented by the general formula of Li$_x$Mn$_a$Co$_b$M$_c$O$_2$ range from 0.45 to 0.55, the discharge capacity, the discharge operating voltage and the initial charge/discharge efficiency are great, and furthermore, an α-NaFeO$_2$ type crystal structure (monoclinic structure) is obtained as a layer crystal structure and the peaks of LiCo$_2$ and Li$_2$MnO$_3$ are not observed and a single phase is obtained. Consequently, a flat discharge curve was obtained.

On the other hand, when the a and b values exceed the range of 0.45 to 0.55, the discharge capacity, the discharge operating voltage and the initial charge/discharge efficiency are reduced, and furthermore, the peaks of LiCoO2 and Li$_2$MnO$_3$ are generated and a compound having a three-phase crystal structure is formed. Therefore, it can be supposed that the discharge curve also tends to be divided into two stages at the end of the discharge and the crystal shape is changed to be orthorhombic. For this reason, it can be supposed that the discharge capacity, the discharge operating voltage and the initial charge/discharge efficiency are reduced.

Accordingly, it is necessary to carry out a synthesis such that the a and b values are set to 0.45≦a≦0.55 and 0.45≦b≦0.55, respectively. In this case, a compound having such a layer crystal structure does not have many sites in which a lithium ion can be inserted and desorbed as in spinel type lithium manganese oxide so that the lithium ion is inserted and desorbed into and from layers. For this reason, the x value of the positive electrode active material represented by $Li_xMn_aCo_bM_cO_2$ is at most 1.1. In a state in the synthesis stage of the positive electrode active material, moreover, a lithium source has only the positive electrode active material during the fabrication of a battery. In consideration thereof, therefore, it is required that the x value should be at least 0.9. In this respect, it is desirable that the synthesis should be carried out to obtain the x value of $0.9 \leq x \leq 1.1$.

Discharge curves (the relationship between a unit active material capacity (mAh/g) and a discharge voltage (an electric potential for a lithium counter electrode) for a positive electrode using the positive electrode active material α3 ($LiMn_{0.50}Co_{0.50}Ti_{0.01}O_2$) according to the example 3, a positive electrode using lithium containing manganese—nickel composite oxide ($LiMn_{0.50}Ni_{0.50}O_2$) to be a typical positive electrode active material, a positive electrode using spinel type lithium manganese oxide ($LiMn_2O_4$) and a positive electrode using lithium cobalt oxide ($LiCoO_2$) were obtained as shown in a result of FIG. 1. As is apparent from the result of FIG. 1, the positive electrode using the positive electrode active material α3 ($LiMn_{0.50}Co_{0.50}Ti_{00.01}O_2$) according to the example 3 has a high discharge operating voltage which is equivalent to that of each of the positive electrode using the spinel type lithium manganese oxide ($LiMn_2O_4$) and the positive electrode using the lithium cobalt oxide ($LiCoO_2$) and has a plateau potential (a flat potential) in a 4V region.

On the other hand, it was found that the positive electrode using lithium containing manganese—nickel composite oxide ($LiMn_{0.50}Ni_{0.50}O_2$) has a plateau potential in a 4V region, a low discharge operating voltage which is peculiar to an Ni system, and a low initial charge/discharge efficiency of approximately 85%. In contrast, the positive electrode using the positive electrode active material α3 ($LiMn_{0.50}Co_{0.50}Ti_{0.01}O_2$) according to the example 3 had an initial charge/discharge efficiency of 96.2% which is almost equal to that of each of the positive electrode using the spinel type lithium manganese oxide ($LiMn_2O_4$) and the positive electrode using the lithium cobalt oxide ($LiCoO_2$). From this viewpoint, it is apparent that the Li—Mn—Co based positive electrode active material can have a greater advantage than the Li—Mn—Ni based positive electrode active material in respect of an electric potential and a capacity.

In general consideration of the results described above, it is necessary to carry out the synthesis such that the x value of the positive electrode active material represented by the general formula of $Li_xMn_aCo_bM_cO_2$ is set to be $0.9 \leq x \leq 1.1$ and the a and b values are set to $0.45 \leq a \leq 0.55$ and $0.45 \leq b \leq 0.55$. Furthermore, the compositions of the positive electrode active materials α2 to α4, β2 to β4, γ2 to γ4 and χ3 to χ5 having a very small reduction in a capacity are desirable and it is desired that the synthesis should be carried out to obtain the composition ratio of a to b ranging of $0.9 < a/b < 1.1$.

4. Investigation of Heterologous Element (M)

(1) POSITIVE ELECTRODE OF EXAMPLES 16 TO 20

After lithium hydroxide, manganese oxide and cobalt oxide were dissolved in caustic soda respectively, they were mixed to have a mole ratio of the lithium hydroxide, the manganese oxide and the cobalt oxide of 1:0.49(a=0.49): 0.49(b=0.49) based on a hydroxide conversion to obtain a mixed solution. Subsequently, oxide containing a heterologous element (M) was added to and mixed with the mixed solution to have 0.02 mole % for the mole ratio of cobalt hydroxide to manganese hydroxide, and the mixture was then baked provisionally at a low temperature of approximately 500° C. Thereafter, the mixture was baked at a temperature of 800 to 1000° C. in the atmosphere so that a positive electrode active material ($LiMn_{0.49}Co_{0.49}M_{0.02}O_2$) δ1 to δ5 according to examples 16 to 20 was obtained.

Subsequently, a carbon conductive agent and a fluororesin based binder were mixed with the positive electrode active materials δ1 to δ5 in a constant rate (for example, a mass ratio of 92:5:3) to obtain a positive electrode mixture. Then, the positive electrode mixture was applied to both surfaces of a positive electrode formed of an aluminum foil and was thereafter dried, and subsequently, was rolled to have a predetermined thickness to fabricate positive electrodes d1 to d5 according to the examples 16 to 20. The positive electrode active material δ1 ($LiMn_{0.49}Co_{0.49}Al_{0.02}O_2$) according to the example 16 uses aluminum (Al) as the heterorogous element (M), the positive electrode active material δ2 ($LiMn_{0.49}Co_{0.49}Mg_{0.02}O_2$) according to the example 17 uses magnesium (Mg), the positive electrode active material δ3 ($LiMn_{0.49}Co_{0.49}Sn_{0.02}O_2$) according to the example 18 uses tin (Sn), the positive electrode active material δ4 ($LiMn_{0.49}Co_{0.49}Ti_{0.02}O_2$) according to the example 19 uses titanium (Ti), and the positive electrode active material δ5 ($LiMn_{0.49}Co_{0.49}Zr_{0.02}O_2$) according to the example 20 uses zirconium (Zr).

(2) Fabrication of Nonaqueous Electrolyte Secondary Battery

First of all, a negative electrode active material capable of intercalating and deintercalating lithium ion and a styrene based binder were mixed in a constant rate (for example, a mass ratio of 98:2) and water was added to and mixed with them to obtain a negative electrode mixture, and the negative electrode mixture was then applied to both surfaces of a negative electrode formed of a copper foil and they were rolled to fabricate a negative electrode. For the negative electrode active material, a carbon based material capable of intercalating and deintercalating lithium ion, for example, graphite, carbon black, coke, glassy carbon, carbon fiber or their baked product is suitable. Moreover, oxide capable of intercalating and deintercalating lithium ion, for example, tin oxide or titanium oxide may be used.

Subsequently, a lead was attached to each of the positive electrodes d1 to d5 fabricated as described above and the positive electrode x4 (using $LiMn_{0.50}Co_{0.50}O_2$ as a positive electrode active material) according to the comparative example 4 fabricated as described above and a lead was attached to the negative electrode fabricated as described above, and the positive electrodes and the negative electrode were spirally wound through a separator formed of polypropylene so that each spiral electrode member was obtained. Each spiral electrode member was inserted into a battery armor can and each lead was then connected to a positive electrode terminal or a negative electrode terminal. An electrolyte having $LiPF_6$ dissolved in a mixed solvent mixing ethylene carbonate and diethyl carbonate in a volume ratio of 3:7 was injected into the outer armor can and the outer armor can was then sealed to fabricate nonaqueous electrolyte secondary batteries D1 to D5 and X4 which have a capacity of 550 mAh, respectively. The battery can have any shape, for example, can be thin, square or cylindrical and a size thereof is not particularly restricted.

The nonaqueous electrolyte secondary batteries fabricated by using the positive electrodes d1 to d5 were set to be batteries D1 to D5 and the nonaqueous electrolyte secondary battery fabricated by using the positive electrode x4 was set to be a battery X4. The electrolyte is not restricted to the examples described above but LiClO$_4$, LiBF$_4$, LiN(SO$_2$CF$_3$)$_2$, LiN(SO$_2$C$_2$F$_5$)$_2$ or LiPF$_{6-x}$(C$_n$F$_{2n+1}$)$_x$ (1≦X≦6, n=1, 2) is d Li salt (an electrolyte salt), for example, and one of them or more can be mixed for use. The concentration of the electrolyte salt is not particularly restricted but 0.2 to 1.5 mol (0.2 to 1.5 mol/l) per liter of an electrolyte is desirable.

Moreover, propylene carbonate, ethylene carbonate, butylene carbonate, dimethyl carbonate, diethyl carbonate, ethyl methyl carbonate or γ-butyrolactone is desirable for a solvent, and one of them or more can be mixed for use. A carbonate based solvent is preferred and it is preferable that cyclic carbonate and acyclic carbonate should be mixed for use. The propylene carbonate or the ethylene carbonate is preferable for the cyclic carbonate, and the dimethyl carbonate, the diethyl carbonate or the ethyl methyl carbonate is preferable for the acyclic carbonate.

5. Test (1) Measurement of Capacity Retention Rate

There was repeated a cycle test having, as one cycle, 4.2 V-500 mA constant current—constant voltage charging and 500 mA constant current discharging in which the batteries D1 to D5 and X4 fabricated as described above were charged to 4.2 V with a charging current of 500 mA (1 It) in a room temperature (approximately 25° C.) atmosphere and was charged at a 4.2 V constant voltage until a charging current of 25 mA or less was obtained after 4.2 V was reached, the charging was halted for ten minutes, and they were then discharged with a discharging current of 500 mA (1 It) to obtain a final discharging voltage of 2.75 V. A discharge capacity after each cycle was obtained to calculate a capacity retention rate after each cycle (a capacity retention rate (%)=(a discharge capacity after each cycle/a discharge capacity after one cycle)X 100%). Consequently, a result shown in FIG. 2 was obtained. Moreover, when a capacity retention rate after 500 cycles was calculated, a result shown in FIG. 4 was obtained.

Figure 2:
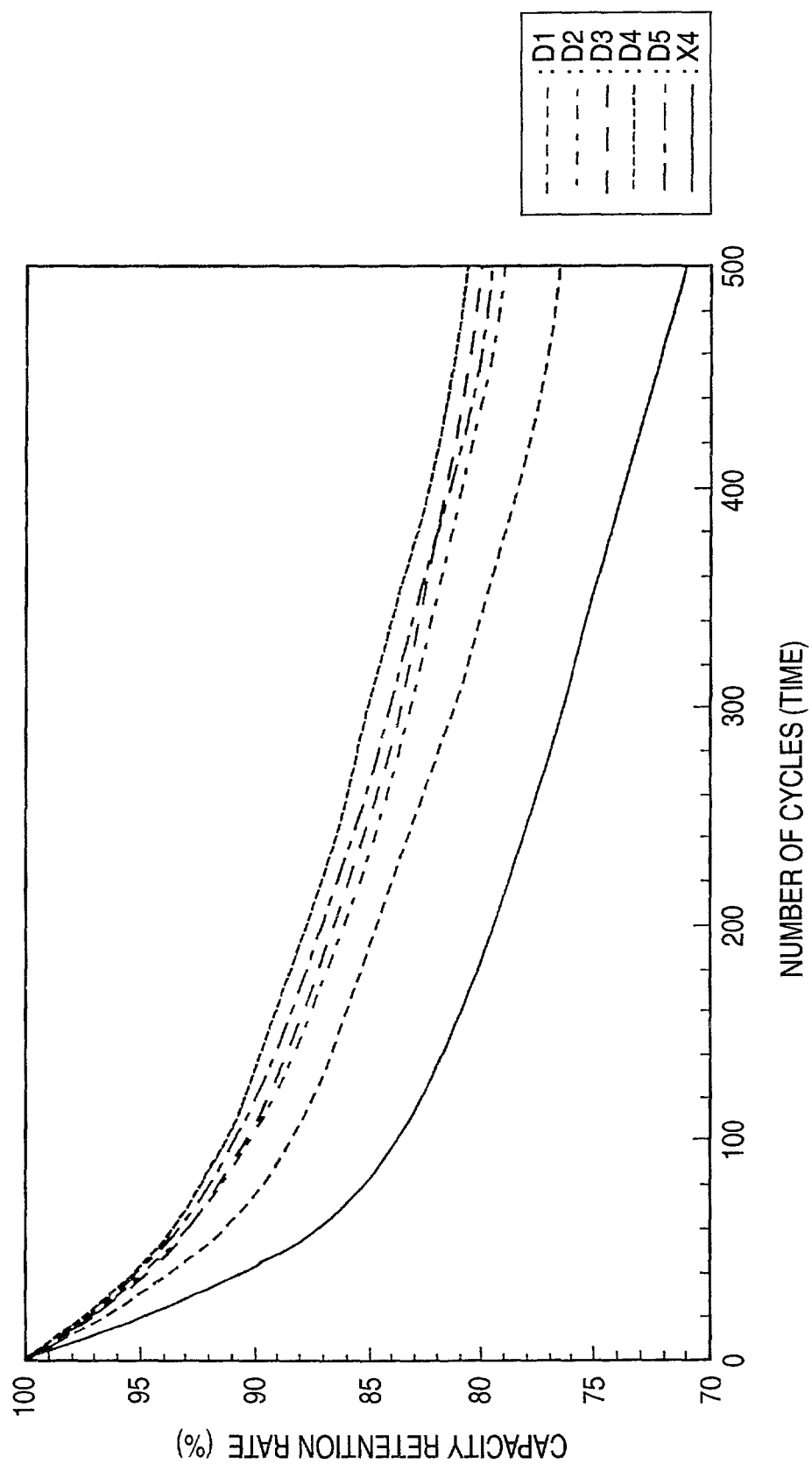
FIG. 2 is a chart showing the relationship between a charge/discharge cycle and a capacity retention rate.

As is apparent from the results shown in FIG. 2 and FIG. 4, a heterologous element (M=Al, Mg, Sn, Ti, Zr) was added to a Li—Mn—Co based positive electrode active material and a part of them was substituted for the heterologous element (M=Al, Mg, Sn, Ti, Zr) to obtain a positive electrode active material LiMn$_{0.49}$Co$_{0.49}$Al$_{0.02}$O$_2$, a positive electrode active material LiMn$_{0.49}$Co$_{0.49}$Mg$_{0.02}$O$_2$, a positive electrode active material LiMn$_{0.49}$Co$_{0.49}$Sn$_{0.02}$O$_2$, a positive electrode active material LiMn$_{0.49}$Co$_{0.49}$Ti$_{0.02}$O$_2$, and a positive electrode active material LiMn$_{0.49}$Co$_{0.49}$Zr$_{0.02}$O$_2$. Thus, it is apparent that the capacity retention rate can be enhanced. The reason is that a part of the Li—Mn—Co based positive electrode active material is substituted for the heterologous element (M) such as Al, Mg, Sn, Ti or Zr to stabilize the crystallinity of a layer structure.

While other elements such as Ni, Ca or Fe were also investigated as the heterologous element, the effect of enhancing the capacity retention rate could not be observed. The reason is that a crystal shape and a crystal size after the substitution have problems. In these respects, it is necessary to carry out the synthesis such that the x value of the positive electrode active material represented by the general formula of Li$_x$Mn$_a$Co$_b$M$_c$O$_2$ is set to 0.9≦x≦1.1 and the a and b values are set to 0.45≦a≦0.55 and 0.45≦b≦0.55 respectively and to select the heterologous element (M) from Al, Mg, Sn, Ti and Zr.

(2) High Temperature Preservation Characteristic After Charging

Moreover, the batteries D1 to D5 and X4 fabricated as described above were charged to 4.2 V with a charging current of 500 mA (1 It) in a room temperature atmosphere and were charged at a 4.2 V constant voltage until a charging current of 25 mA or less was obtained after 4.2 V was reached, and were then preserved for 20 days in a 60° C. atmosphere. An after-preservation discharge capacity was obtained from a discharging time when the batteries D1 to D5 and X4 after the preservation were discharged to have a final discharging voltage of 2.75 V with a discharging current of 500 mA (1 It), and a ratio to a before-preservation discharge capacity was obtained to calculate a capacity retention rate (%). Thus, a result shown in FIG. 5 was obtained. Moreover, they were discharged again to obtain a recovery discharge capacity from the discharging time and a ratio to the before-preservation discharge capacity, thereby calculating a capacity recovery rate (%). Thus, a result shown in FIG. 5 was obtained. Furthermore, when a battery expansion rate (a maximum value) was calculated from an increase rate of the thickness of each of the batteries D1 to D5 and X4 after the preservation (an increase rate of the thickness after the preservation for the thickness of each battery before the preservation). Thus, the result shown in FIG. 5 was obtained.

(3) High Temperature Preservation Characteristic After Discharging

Furthermore, the batteries D1 to D5 and X4 fabricated as described above were charged to 4.2 V with a charging current of 500 mA (1 It) in a room temperature atmosphere and were charged at a 4.2 V constant voltage until a charging current of 25 mA or less was obtained after 4.2 V was reached and were then discharged with a discharging current of 500 mA (1 It) to obtain a battery voltage of 2.75 V, and were thereafter preserved for 20 days in a 60° C. atmosphere. The preserved batteries D1 to D5 and X4 were charged and discharged again to obtain a recovery discharge capacity from a discharging time thereof and a ratio to a before-preservation discharge capacity, thereby calculating a capacity retention rate (%). Thus, a result shown in FIG. 5 was obtained. Furthermore, when a battery expansion rate (a maximum value) was calculated from an increase rate of the thickness of each of the batteries D1 to D5 and X4 after the preservation (an increase rate of the thickness after the preservation for the thickness of each battery before the preservation). Thus, the result shown in FIG. 5 was obtained. In the FIG. 5, a retention rate indicates the capacity retention rate and a recovery rate indicates the capacity recovery rate.

As is apparent from the result shown in the FIG. 5, at the 4.2 V final charging after preservation, the batteries D1 to D5 have the capacity retention rates and the capacity recovery rates improved more greatly than those of the battery X4 and also have the expansion rates more reduced than the expansion rate of the battery X4 so that the effect of suppressing gas generation can be enhanced. Also at the 2.75 V final discharging after preservation, each of the batteries D1 to D5 has the capacity recovery rate improved more greatly than that of the battery X4, and has the expansion rate more reduced than that of the battery X4 so that the effect of suppressing the gas generation can be enhanced. At present, the detailed reason is not clear but it can be supposed that a coat is formed on the surface of a positive electrode to suppress a reactivity with an electrolyte in addition to the stabilization of a crystal structure by the substitution of the heterologous element.

6. Investigation of Amount of Substitution of Heterologous Element (M)

Subsequently, the amount of addition of a heterologous element was investigated.

(1) POSITIVE ELECTRODE ACTIVE MATERIAL ACCORDING TO EXAMPLES 21 TO 24 AND COMPARATIVE EXAMPLE 14

After lithium hydroxide, manganese oxide and cobalt oxide were dissolved in caustic soda respectively, they were prepared and mixed to have a predetermined mole ratio of the lithium hydroxide, the manganese oxide and the cobalt oxide so that a mixed solution was obtained. Titanium oxide was added to and mixed with the mixed solution to have a predetermined mole ratio for cobalt hydroxide to manganese hydroxide, and the mixture was then baked provisionally at a low temperature of approximately 500° C. Thereafter, the mixture was baked at a temperature of 800 to 1000° C. in the atmosphere so that a positive electrode active material according to each of examples 21 to 24 was obtained. A positive electrode active material ($Li_xMn_aCo_bTi_cO_2$) prepared to have x:a:b:c=1:0.495:0.495:0.01(a+b+c=1.00) was set to be a positive electrode active material ($LiMn_{0.495}Co_{0.495}Ti_{0.01}O_2$) $\epsilon1$ according to the example 21. Similarly, a positive electrode active material prepared to have x:a:b:c=1:0.490:0.490:0.02 (a+b+c=1.00) was set to be a positive electrode active material ($LiMn_{0.490}Co_{0.490}Ti_{0.02}O_2$) $\epsilon2$ according to the example 22, a positive electrode active material prepared to have x:a:b:c=1:0.485:0.485:0.03 (a+b+c=1.00) was set to be a positive electrode active material ($LiMn_{0.485}Co_{0.485}Ti_{0.03}O_2$) $\epsilon3$ according to the example 23, and a positive electrode active material prepared to have x:a:b:c=1:0.475:0.475:0.05 (a+b+c=1.00) was set to be a positive electrode active material ($LiMn_{0.475}Co_{0.475}Ti_{0.05}O_2$) $\epsilon4$ according to the example 24. Moreover, a positive electrode active material prepared to have x:a:b:c=1:0.450:0.450:0.10 (a+b+c=1.00) was set to be a positive electrode active material ($LiMn_{0.450}Co_{0.450}Ti_{0.10}O_2$) $\chi14$ according to the comparative example 14.

(2) POSITIVE ELECTRODE ACTIVE MATERIAL OF EXAMPLES 25 TO 28 AND COMPARATIVE EXAMPLE 15

Moreover, after lithium hydroxide, manganese oxide and cobalt oxide were dissolved in caustic soda respectively, they were prepared and mixed to have a predetermined mole ratio of the lithium hydroxide, the manganese oxide and the cobalt oxide so that a mixed solution was obtained. Aluminum oxide was added to and mixed with the mixed solution to have a predetermined mole ratio for cobalt hydroxide to manganese hydroxide, and the mixture was then baked provisionally at a low temperature of approximately 500° C. Thereafter, the mixture was baked at a temperature of 800 to 1000° C. in the atmosphere so that a positive electrode active material according to each of examples 25 to 28 was obtained. A positive electrode active material ($Li_xMn_aCo_bAl_cO_2$) prepared to have x:a:b:c=1:0.495:0.495:0.01 (a+b+c=1.00) was set to be a positive electrode active material ($LiMn_{0.495}Co_{0.495}Al_{0.01}O_2$) $\zeta1$ according to the example 25. Similarly, a positive electrode active material prepared to have x:a:b:c=1:0.490:0.490:0.02 (a+b+c=1.00) was set to be a positive electrode active material ($LiMn_{0.490}Co_{0.490}Al_{0.02}O_2$) $\zeta2$ according to the example 26, a positive electrode active material prepared to have x:a:b:c=1:0.485:0.485:0.03(a+b+c=1.00) was set to be a positive electrode active material ($LiMn_{0.490}Co_{0.490}Al_{0.03}O_2$) $\zeta3$ according to the example 27, and a positive electrode active material prepared to have x:a:b:c=1:0.475:0.475:0.05(a+b+c=1.00) was set to be a positive electrode active material ($LiMn_{0.475}Co_{0.475}Al_{0.05}O_2$) $\zeta4$ according to the example 28. Moreover, a positive electrode active material prepared to have x:a:b:c=1:0.450:0.450:0.10 (a+b+c=1.00) was set to be a positive electrode example 15.

(3) POSITIVE ELECTRODE ACTIVE MATERIAL OF EXAMPLES 29 TO 32 AND COMPARATIVE EXAMPLE 16

Moreover, after lithium hydroxide, manganese oxide and cobalt oxide were dissolved in caustic soda respectively, they were prepared and mixed to have a predetermined mole ratio of the lithium hydroxide, the manganese oxide and the cobalt oxide so that a mixed solution was obtained.

Magnesium oxide was added to and mixed with the mixed solution to have a predetermined mole ratio for cobalt hydroxide to manganese hydroxide, and the mixture was then baked provisionally at a low temperature of approximately 500° C. Thereafter, the mixture was baked at a temperature of 800 to 1000° C. in the atmosphere so that a positive electrode active material according to each of examples 29 to 32 was obtained. A positive electrode active material ($Li_xMn_aCo_bMg_cO_2$) prepared to have x:a:b:c=1: 0.495:0.495:0.01 (a+b+c=1.00) was set to be a positive electrode active material ($LiMn_{0.495}Co_{0.495}Mg_{0.01}O_2$) $\eta1$ according to the example 29.

Similarly, a positive electrode active material prepared to have x:a:b:c=1 0.490:0.490:0.02(a+b+c=1.00) was set to be a positive electrode active material ($LiMn_{0.490}Co_{0.490}Mg_{0.02}O_2$) $\eta2$ according to the example 30, a positive electrode active material prepared to have x:a:b:c=1:0.485:0.485:0.03(a+b+c=1.00) was set to be a positive electrode active material ($LiMn_{0.485}Co_{0.485}Mg_{0.30}O_2$) $\eta3$ according to the example 31, and a positive electrode active material prepared to have x:a:b:c=1: 0.475:0.475:0.05(a+b+c=1.00) was set to be a positive electrode active material ($LiMn_{0.475}Co_{0.475}Mg_{0.05}O_2$) $\eta4$ according to the example 32. Moreover, a positive electrode active material prepared to have x:a:b:c=1:0.450:0.450:0.10(a+b+c =1.00) was set to be a positive electrode active material ($LiMn_{0.450}Co_{0.450}Mg_{0.10}O_2$) $\chi16$ according to the comparative example 16.

When the X-ray diffraction patterns of the positive electrode active materials $\epsilon1$ to $\epsilon4$, $\zeta1$ to $\zeta4$ and $\eta1$ to $\eta4$ according to the examples were obtained, the peaks of $LiCoO_2$ and $Li_2MnO_3$ were not observed and an $\alpha$-$NaFeO_2$ type crystal structure (a layer crystal structure having a single phase) was found. Moreover, when the X-ray diffraction patterns of the positive electrode active materials x14 to x16 were obtained, the peaks of $LiCoO_2$ and $Li_2MnO_3$ were observed and a mixture having a 3-phase crystal structure was found.

Subsequently, positive electrodes e1 to e4, f1 to f4, g1 to g4 and x14 to x16 were fabricated by using the positive electrode active materials $\epsilon1$ to $\epsilon4$, $\zeta1$ to $\zeta4$, $\eta1$ to $\eta4$ and $\chi14$ to $\chi16$ in the same manner as described above, and nonaqueous electrolyte secondary batteries E1 to E4, F1 to F4, G1 to G4 and X14 to X16 were fabricated by using the negative electrode in the same manner as described above. The batteries E1 to E4, F1 to F4, G1 to G4 and X4 to X16 thus fabricated were charged to 4.2 V with a charging current of 500 mA (1 It) in a room temperature (approximately 25° C.) atmosphere and were charged at a 4.2 V constant voltage until a charging current of 25 mA or less was obtained after 4.2 V was reached, and the charging was then halted for 10 minutes, and they were then discharged with a discharging current of 500 mA (1 It) until a final discharging voltage of 2.75 V was obtained. Thereafter, an initial charge/discharge efficiency was calculated based on the equation (1) so that a result shown in FIG. 6 was obtained.

Moreover, there was repeated a cycle test having, as one cycle, 4.2 V 500 mA constant current—constant voltage charging and 500 mA constant current discharging in which the batteries E1 to E4, F1 to F4, G1 to G4 and X14 to X16 fabricated as described above were charged to 4.2 V with a charging current of 500 mA (1 It) in a room temperature (approximately 25° C.) atmosphere and were charged at a 4.2 V constant voltage until a charging current of 25 mA or less was obtained after 4.2V was reached, the charging was halted for ten minutes, and they were then discharged with a discharging current of 500 mA (1 It) to obtain a final discharging voltage of 2.75 V. When a capacity retention rate after 500 cycles (a discharge capacity after 500 cycles/a discharge capacity after one cycle X 100%) was calculated, a result shown in FIG. 6 was obtained. In FIG. 6, the positive electrode active material according to the comparative example 4 is also indicated for the battery X4 using x4.

As is apparent from the result shown in the FIG. 6, there are reduced the capacity retention rate and initial charge/discharge efficiency of each of the batteries X14 to X16 using the positive electrode active materials x14 to x16 according to the comparative examples 14 to 16 in which the amount of substitution of the heterologous element such as Ti, Al or Mg is 0.10 mole % The reason is as follows. The crystal structure tends to have two phases or more when the amount of substitution of the heterologous element such as Ti, Al or Mg exceeds 0.05 mole %. Therefore, when the amount of substitution of the heterologous element such as Ti, Al or Mg is too increased, it is hard to maintain the crystal shape. Therefore, it is necessary to set the amount of substitution of the heterologous element such as Ti, Al or Mg to be 0.05 mole % (c=0.05) or less.

7. Relationship Between (a+b+c) Value and Crystal Shape

Subsequently, there have been investigated the (a+b+c) value of the positive electrode active material represented by the general formula of $Li_xMn_aCo_bTi_cO_2$ and the crystal shape.

First of all, lithium hydroxide, manganese oxide, cobalt oxide and titanium oxide were blended to obtain a composition (x=1.0, a/b=1, a≧0.45, b≦0.55, 0.0<c≦0.05) shown in FIG. 7 and were baked in the same manner as described above so that positive electrode active materials θ1 to θ5 according to examples 33 to 37 and a positive electrode active material χ17 according to a comparative example 17 were obtained.

Moreover, lithium hydroxide, manganese oxide, cobalt oxide and titanium oxide were blended to obtain a composition (x=1.0, a≧0.45, b ≦0.55, a>b, 0.0<c≦0.05) shown in FIG. 7 and were baked in the same manner as described above so that positive electrode active materials τ1 to τ5 according to examples 38 to 42 and a positive electrode active material χ18 according to a comparative example 18 were obtained. Furthermore, lithium hydroxide, manganese oxide, cobalt oxide and titanium oxide were blended to obtain a composition (x=1.0, a≧0.45, b≦0.55, b<0.55, b>a, 0.0<c<0.05) shown in FIG. 7 and were baked in the same manner as described above so that positive electrode active materials κ1 to κ5 according to examples 43 to 47 and a positive electrode active material χ19 according to a comparative example 19 were obtained.

As is apparent from the result of the FIG. 7, if the (a+b+c) value of the positive electrode active material represented by the general formula of $Li_xMn_aCo_bTi_cO_2$ ranges from 0.90 to 1.10, a layer crystal structure can be maintained. On the other hand, if the (a+b+c) value exceeds the range of 0.90 to 1.10, the peaks of $LiCoO_2$ and $Li_2MnO_3$ appear in an X-ray diffraction peak so that a mixture with a crystal structure having two phases or more is obtained. Consequently, it is necessary to carry out preparation such that the (a+b+c) value of the positive electrode active material represented by the general formula of $Li_xMn_aCo_bTi_cO_2$ is set to 0.90<a+b+c≦1.10.

As described above, in the invention, there is provided a positive electrode containing a positive electrode active material comprising lithium containing composite oxide having a layer crystal structure represented by a general formula of $Li_xMn_aCo_bM_cO_2$ (0.9≦X≦1.1, 0.45≦a≦0.55, 0.45≦b≦0.55, 0<c≦0.05 and 0.9<a+b+c≦1.1 are set and M is at least one kind selected from Al, Mg, Sn, Ti and Zr). Therefore, it is possible to obtain a nonaqueous electrolyte secondary battery which has a plateau potential in a 4V region that is almost equivalent to lithium cobalt oxide, has a large discharge capacity and is excellent in a battery characteristic such as a cycle characteristic or a high temperature characteristic.

While the example in which the lithium hydroxide is used as the lithium source has been described in the embodiment, a lithium compound such as lithium carbonate, lithium nitrate or lithium sulfate may be used in addition to the lithium hydroxide. Moreover, while the example in which the manganese oxide is used as the manganese source has been described, a manganese compound such as manganese hydroxide, manganese sulfate, manganese carbonate or manganese oxyhydroxide may be used in addition to the manganese oxide. Furthermore, while the example in which the cobalt oxide is used as the cobalt source has been described, a cobalt compound such as cobalt carbonate, cobalt hydroxide or cobalt sulfate may be used in addition to the cobalt oxide.

Moreover, while the example in which the lithium hydroxide, the manganese oxide and the cobalt oxide are mixed in a state of hydroxide, the heterologous element is added thereto and is then baked has been described in the embodiment, the lithium source, the manganese source, the cobalt source and the heterologous element may be baked in a solid-phase state.

Furthermore, while the example in which oxide such as Ti, Al, Mg, Sn or Zr is added in the addition of the heterologous element such as Ti, Al, Mg, Sn or Zr has been described in the embodiment, the oxide such as Ti, Al, Mg, Sn or Zr is not always required but sulfide such as Ti, Al, Mg, Sn or Zr or hydroxide such as Ti, Al, Mg, Sn or Zr may be added.

Moreover, while the example in which the invention is applied to the nonaqueous electrolyte secondary battery using the organic electrolyte has been described in the embodiment, it is apparent that the organic electrolyte is not restricted but the invention can also be applied to a nonaqueous electrolyte secondary battery using a polymer solid electrolyte. In this case, it is preferable to use, as the polymer solid electrolyte, a gel-like solid electrolyte which is obtained by combining a polycarbonate based solid polymer, a polyacrylonitrile based solid polymer, a copolymer comprising two kinds of them or more or a crosslinked polymer and a fluorine based solid polymer such as polyvinylidene fluoride (PVdF), a lithium salt and an electrolyte.

What is claimed is:

1. A nonaqueous electrolyte secondary battery comprising a positive electrode containing a positive electrode active material capable of intercalating and deintercalating lithium ions, a negative electrode containing a negative electrode active material capable of intercalating and deintercalating lithium ions, a separator between the positive electrode from and the negative electrode, and a nonaqueous electrolyte, wherein the positive electrode active material comprises lithium containing composite oxide having a layer crystal structure represented by a general formula $Li_xMn_aCo_bM_cO_2$ where $0.9 \leq x \leq 1.1$, $0.45 \leq a \leq 0.55$, $045 \leq b \leq 0.55$, $0 < c \leq 0.05$ and $0.9 < a+b+c \leq 1.1$ and M is at least one element selected from Mg, Sn, Ti and Zr.

2. A nonaqueous electrolyte secondary battery comprising a positive electrode containing a positive electrode active material capable of intercalating and deintercalating lithium ions, a negative electrode containing a negative electrode active material capable of intercalating and deintercalating lithium ions, a separator between the positive electrode from and the negative electrode, and a nonaqueous electrolyte, wherein the positive electrode active material comprises lithium containing composite oxide having a layer crystal structure represented by a general formula $Li_xMn_aCo_bM_cO_2$ where $0.9 \leq x \leq 1.1$, $0.45 \leq a \leq 0.55$, $0.45 \leq b \leq 0.55$, $0 < c \leq 0.05$, $0.9 < a+b+c \leq 1.1$ and $0.9 < a/b < 1.1$ and M is at least one element selected from Mg, Sn, Ti and Zr.

* * * * *